United States Patent

Inagaki et al.

(10) Patent No.: US 6,702,478 B2
(45) Date of Patent: Mar. 9, 2004

(54) OPTICAL FIBER CONNECTOR

(75) Inventors: Takeo Inagaki, 2-30-7, Nakatehara, Kohoku-ku, Yokohama, Kanagawa (JP), 222-0023; Kunihiko Takeda, 10-3-107, Maeno-cho 6-chome, Itabashi-ku, Tokyo (JP), 174-0063; Akira Watanabe, Tokyo (JP); Shigeru Endo, Yokohama (JP); Yoshio Tokai, Funabashi (JP)

(73) Assignees: Takeo Inagaki, Yokohama (JP); Kunihiko Takeda, Itabashi-ku (JP)

( * ) Notice: Subject to any disclaimer, the term of this patent is extended or adjusted under 35 U.S.C. 154(b) by 0 days.

(21) Appl. No.: 10/030,908
(22) PCT Filed: May 10, 2001
(86) PCT No.: PCT/JP01/03891
§ 371 (c)(1), (2), (4) Date: Jan. 14, 2002
(87) PCT Pub. No.: WO01/88584
PCT Pub. Date: Nov. 22, 2001

(65) Prior Publication Data
US 2003/0031422 A1 Feb. 13, 2003

(30) Foreign Application Priority Data
May 12, 2000 (JP) ........................................ 2000-179112

(51) Int. Cl.[7] ................................................. G02B 6/38
(52) U.S. Cl. .............................. 385/72; 385/55; 385/77
(58) Field of Search .............................. 385/72, 76, 77, 385/78, 81, 84–89, 55, 56

(56) References Cited

U.S. PATENT DOCUMENTS 5,436,995 A  7/1995  Yoshizawa

FOREIGN PATENT DOCUMENTS

| EP | 689 069 A | 12/1995 |
|---|---|---|
| JP | 6-324231 A | 11/1994 |
| JP | 10-111429 A | 4/1998 |

Primary Examiner—Khiem Nguyen
(74) Attorney, Agent, or Firm—Smith Patent Office

(57) ABSTRACT

In the connection of the optical fiber wires, it is required to align each axis of two optical passages to be connected, to minimize the connection space, and to include a retaining mechanism capable of preventing any invasion of foreign materials, such as dust, vapor and water. A pair of ferrule holders 2 for retaining a pair of optical fiber wires 21 positioned opposed to each other through an adapter B are rotated simultaneously by rotating an outer ring 4 to correct the displacement of the axes of the optical fiber wires. Further, a rotating stopper portion 33 on the shaft of the ferrule holder 2 is moved in conjunction with an elastic rotating stopper plate 13 disposed at the adapter B to retain the corrected position. A silicone low crosslinking-density gel 41 having the refractive index substantially equal to that of the optical fiber wires 21 is filled in a connection space 32, to minimize the connection space 32. The function of the silicone low crosslinking-density gel 41 can cope with any variance of external environment to retain the junction of the optical fiber wires 21 and prevent any deterioration of optical transmittance.

7 Claims, 3 Drawing Sheets

OPTICAL FIBER CONNECTOR

TECHNICAL FIELD

The present invention relates to an optical fiber connector for connecting an optical fiber wire (core, clad sections) to another optical fiber wire according to a fixed type connecting technique or a detachable type connecting technique.

BACKGROUND ART

A first conventional technique for connecting an optical fiber wire to another optical fiber wire is a fusion-bonding technique, in which the axes of the optical fiber wires are aligned with each other at their butted portions, and the butted portions of the optical fiber wires are fused in the form of a fusion bonding. A fusion-bonding device is used for this technique. A second conventional technique is a fixed type connecting technique, in which optical fiber wires to be connected are embedded in advance within a fitting provided in a connection passage of the optical fiber wires, and the optical fiber wires are mechanically fixed by filling up an oil material, a grease material, an epoxy resin material, or a state-of-the-art gel material in the connection space. A splicer or an optical distributor is used for this technique. A third conventional technique is a detachable type connecting technique, in which a ferrule is fitted to each end of optical fiber wires, and the optical fiber wires are mechanically butted through an adapter to be joined each other. An optical fiber connector is used for this technique. In order to reduce connection loss, some optical fiber connector uses a lens, an oil material, a grease material, or a state-of-the-art gel material in the connection space. (For example, Japanese Patent Laid-Open Publication No. Sho 56-110912 discloses an optical fiber connector using a lens, Japanese Patent Laid-Open Publication No. Sho 56-081807 disclosing an optical fiber connector using an oil material, and Japanese Utility Model Publication No. Hei 04-043841 disclosing an optical fiber connection using a gel material.)

Fundamental requirements for connecting optical fiber wires are as follows.
i) Two optical passages (cores) to be connected are positioned on the aligned axes of the optical fiber wires;
ii) The connection space is strictly small; and
iii) The retaining mechanism is capable of preventing any invasion of foreign materials such as dust, vapor or water.

From this point of view, the conventional connecting techniques have the following disadvantages.

The first conventional technique or fusion-bonding technique satisfies the above three fundamental requirements. However, it is not detachable type, and thereby cannot be used as a connector.

In the second conventional technique or fixed type connecting technique, it is required to employ a complicated mechanism and take a number of assembling hours for fabricating and aligning the embedding portion of the optical fiber wires to satisfy the above fundamental requirements. In addition, the oil or grease enclosed in the connection space is inevitably run out or oxidized. The epoxy resin is not run out but inevitably oxidized. This technique is not detachable type, and thereby cannot be used as a connector, resulting in limited application.

The third conventional technique or detachable type connecting technique uses the structure in which the ferrule is fitted to each end of the optical fiber wires, and the optical fiber wires are mechanically butted through an adapter to be joined each other. Thus, as compared with the first and second conventional techniques, this technique cannot satisfy the first and second fundamental requirements, and thereby the optical transmittance is inevitably reduced. While various polishing, such as planar surface polishing, spherical surface polishing, or inclined surface polishing, has been applied to the end of the optical fiber wire to suppress this optical attenuation and improve the optical transmittance, the above first and second fundamental requirements are not sufficiently satisfied.

DISCLOSURE OF THE INVENTION

The present invention provides an optical fiber connector capable of satisfying the aforementioned three fundamental requirements. A typical optical fiber connector includes FC-type and SC-type specified in JIS. While they have a difference in coupling arrangement, they commonly rely upon the machining accuracy of the ferrule and adapter to align the axes of optical fiber wires.

For example, in the FC-type optical fiber connector, or an optical fiber connector for single mode optical fiber wires, on the assumption that each of optical fiber wires has a standard dimension or size, a ferrule to be fitted to the optical fiber wire has an outside dimension of 2.4995 mm with its tolerance of ±0.0005 mm, and a hole for passing the optical fiber wire therethrough and having a diameter of 0.125 mm, in which the tolerance of the concentric circle with respect to the hole is limited to ±0.0014 mm. Further, an adapter for inserting the ferrule thereinto has an inner diameter of 2.501 mm with its tolerance of +0.003 mm. The ferrule and the adapter are coupled by a connection nut with guiding them along two key grooves formed at a ferrule holder and the adapter, respectively.

The connector is made with these accurate numerical values. However, each connection loss actually measured at both ends of the connector exhibits a significantly different value. Specifically, provided that one end "a" of both ends of a single optical fiber connector is an entrance (transmit section) and the other end "b" is an outlet (receive section), each of the ends is connected to a master cord. When comparing the connection loss in case of using the end "a" as a junction with the connection loss in case of using the end "b" as a junction, the difference is up to about 0.15 dB. This is caused by the displacement with respect to the axes of the optical fiber wires and the optical attenuation in the connection space. By way of experiment, when using a rotatable adapter and measuring with rotating the ferrule, the difference between the above connection losses was reduced in all of 20 samples. This proves that the difference is caused by the displacement with respect to the axis. The conventional optical fiber connectors do not have any mechanism for correcting such displacement with respect to the axes of the optical fiber wires.

In order to solve the aforementioned first problem, a mechanism for correcting such displacement with respect to the axes of the optical fiber wires is achieved by making a ferrule holder rotatable, and providing in the adaptor a mechanism for stopping the rotation of the ferrule holder at a optimum value with measuring the connection loss and retaining the ferrule holder.

A connection space inevitably exists at the junction of two optical fiber wires, i.e., between opposed ends of the optical fiber wires. While the oil or grease has been used to minimize this space, this application is limited due to its functional drawback, such as running out or oxidization. In order to solve the second problem, a transparent silicone low crosslinking-density gel having a refractive index substantially equal to that of the optical fiber wires is filled in the connection space to use as a junction conductor.

The composition and physical property of the silicone low crosslinking-density gel are as follows.

1. Composition: silicone mixture
2. Refractive index: 1.465 ±0.005
3. Viscosity: between 100,000 cP or more and 150,000 cP inclusive or less
4. Appearance: transparent
5. Temperature: usable in the range of −20° C. to 120° C. substantially no variation at room temperature
6. Water absorbing property: water absorption to the composition is 0.1% or less
7. Hygroscopic property: substantially no hygroscopic property to the composition
8. Anti-dust: dust may attach to the surface, but does not penetrate into the composition
9. Pressure resistance: freely deformable to pressure
10. Vibration resistance: no separation or no disassembly
11. Chemicals resistance: insoluble to most solvents
12. Oxidation: inoxidizable
13. Liquidity: illiquidity, deformable to pressure
14. Period for performance guarantee: over 20 years at room temperature The basic model of the conventional optical fiber connectors is the FC-type for indoor use, and a retention mechanism is added depending upon application. For example, a water-resistant optical fiber connector uses a sealing material applied over the external of the FC-type. To solve the third problem, the aforementioned silicone low crosslinking-density gel is used in the junction of two optical fiber wires as a junction conductor. For example, in the FC-type, the silicone low crosslinking-density gel is enclosed in the connection space of the optical fiber wires fitted with the ferrules for connecting to the adapter. This can provide an all-weather optical fiber connector having an optical transmittance of 99% or more and a connection loss of 0.02 dB for any variation of external environment without any change of the size of the connector or any additional structure or mechanism.

BEST MODE FOR CARRYING OUT THE INVENTION

An embodiment of the present invention will now be described with reference to the drawings.

Figure 3:
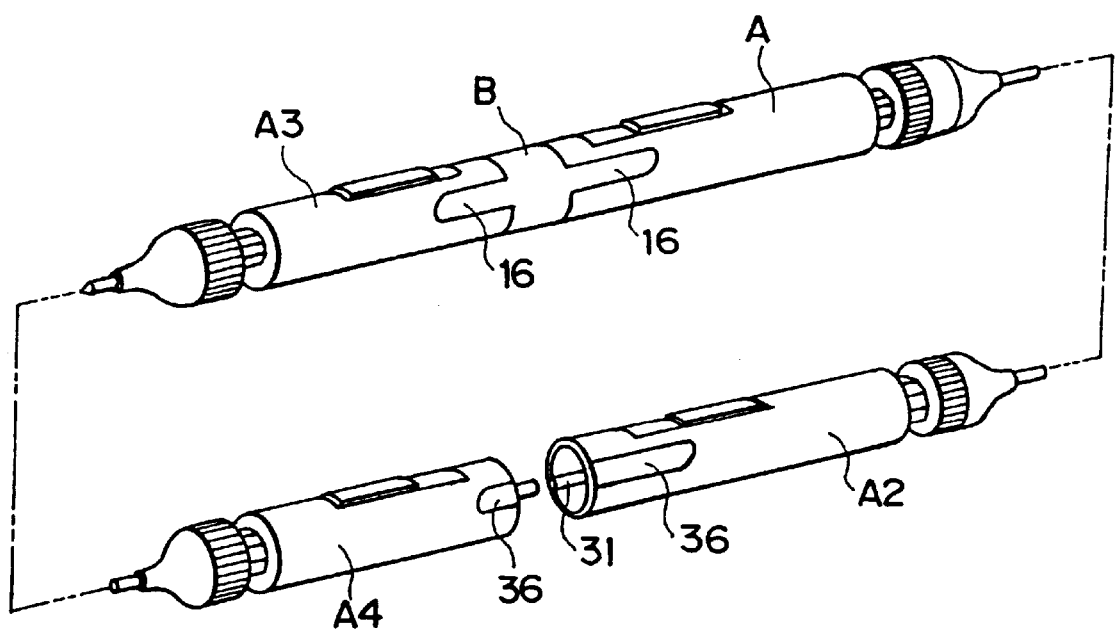
FIG. 3 is an external view of a constitutional unit of an optical fiber connector, or a schematic view of a measuring apparatus A according to one embodiment of the present invention.

In FIG. 3, the connection of an optical fiber connector comprises four plugs A and one adapter B.

Figure 1:
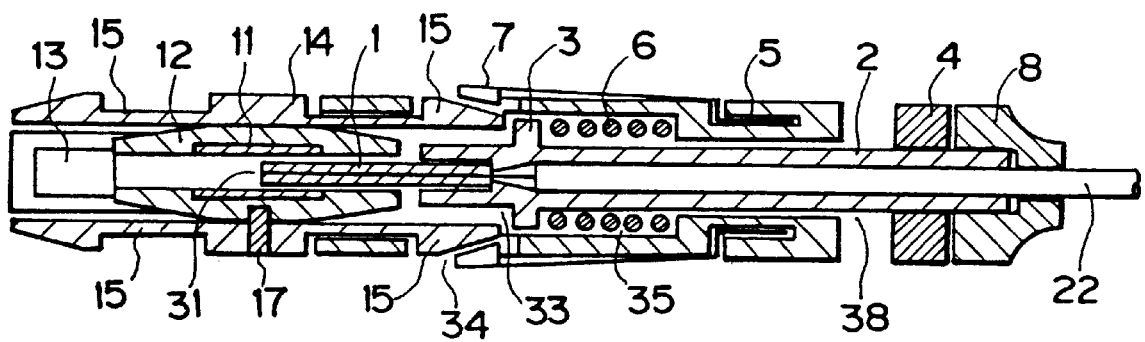
FIG. 1 is a longitudinally sectional view showing an embodiment of an optical fiber connector, wherein a plug has the same structure on the right side and the left side thereof, and thereby only one of the sides is illustrated.

In FIG. 1, the plug A comprises a ferrule 1, a cylindrical rotatable ferrule holder 2 to which the ferrule 1 is attached, a case 5 for housing the ferrule holder 2, a buffer coil spring 6, and a rotating outer ring 4. The ferrule holder 2 includes a rotation stopper portion 33 having a regular octagon-shaped cross-section and a flange 3 for receiving the buffer coil spring at the ferrule-mounting portion of the ferrule holder 2. The ferrule holder 2 also includes a polygonal shaft portion 38 for attaching an optical fiber wire at the rear end of the ferrule holder 2. The case 5 includes a pair of coupling guide side-grooves 36 and a pair of coupling elongated-holes 34, a pair of coupling-release push springs 7 extending in the middle of the pair of coupling elongated-holes 34, respectively, in an opposed relationship with each other. After the ferrule holder 2 is fitted into the case 5, the rotating outer ring 4 is press-fitted into the rear end of the ferrule holder 2. An optical fiber wire 21 and an optical fiber core wire 22 are retained by the ferrule 1 and the ferrule holder 2.

The adapter B will now be described with reference to FIGS. 1 and 2.

The pair of ferrules 1 opposed to each other are retained by a sleeve 11. A shell 12 housing the sleeve 11 is split into two and the inner wall of the shell 12 is formed in an octahedron to retain the sleeve 11. The shell 12 is also formed with elastic rotation stopper plates 13 symmetric with respect to the axis to contact closely with two faces of the octahedron of the rotation stopper portion 33, respectively, provided at the ferrule-mounting portion of the ferrule holder 2. The elastic rotation stopper plate 13 is provided at each of both ends of the shell 12 at given opposed positions. A space 37 for allowing the elastic rotation stopper plate to be bent is provided between the outer wall of the elastic rotation stopper plate 13 and the inner wall of an adapter body 14. The adaptor body 14 is provided with a pair of engagement stems each having a coupling hook 15 and a pair of positioning guides 16 at given positions of both ends of the adapter body 14. The pair of engagement stems are engaged with the elongated holes 34 of the case 5 of the plug A, respectively. The pair of positioning guides 16 are fitted into the coupling side-grooves 36 of the plug A, respectively. The adapter B is completed by inserting the shell 12 into the adapter body 14 and fixing by a knock pin 17.

Figure 2:
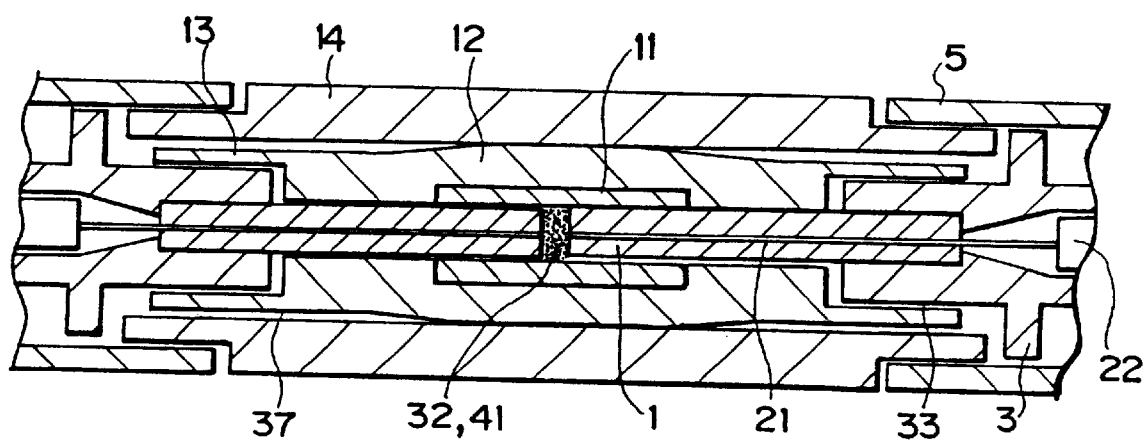
FIG. 2 is a horizontal sectional view showing an embodiment of the coupling portion of an adapter and a plug.

In FIG. 2, a silicone low crosslinking-density gel 41 is enclosed by applying the silicone low crosslinking-density gel 41 on the end 31 of the ferrule with an optical fiber bonding material injection device, inserting the pair of plugs A from both inserting ports of the adapter B to couple the pair of plugs A.

In FIG. 1, for coupling the adapter B with the plug A, the ferrule 1 protruding from the front end of the plug A is inserted into an insertion port opened at the center of the adapter B, and pushed therein with matching the positioning guide of the adapter B with the coupling guide side-groove 36 of the plug A. Then, the engagement stems each having the hook 15 are moved in conjunction with the ferrule 1 and are engaged with the coupling elongated-holes 34 provided in the case 5 serving as a coupling portion with the plug A, respectively.

In FIG. 1, for releasing the connection between the adapter B and the plug A, the coupling-release springs 7 provided in the case 5 are pushed inward to release the hooks of the latching sticks 15, and the plug A is then pulled out to complete the releasing operation.

With reference to FIGS. 1 and 2, an axes positioning mechanism for correcting the displacement of the axes of an optical fiber wire 21 and another optical fiber wire 21 will be described.

In FIG. 2, a pair of ferrules 1 each fitted with an optical fiber wires 21 and a pair of ferrule holders 2 are positioned opposed to each other through the adapter B. In this state, the both axes of the pair of optical fiber wires 21 are hardly aligned with each other. These positions are corrected by simultaneously rotating each of the rotating outer rings 4 of the ferrule holders 2. More specifically, for stopping and retaining the ferrule holders 2, the two faces of the rotation stopper portion 33 formed in the polygonal cross-section provided at the ferrule-mounting portion are closely contacted with and pressed by the elastic rotation stopper plate 13 provided in the shell 12 housed in the adapter body 14. In this state, when the rotating outer rings 4 provided in the ferrule holders 2 are rotated, the rotation stopper portions 33 formed in the polygon are also rotated. At this moment, the elastic rotation stopper plate 13 is bent outwardly by the corners of the rotation stopper portion 33 formed in the polygon to allow the rotation stopper portion 33 to be rotated. Then, the rotation stopper portion 33 is stopped when the elastic rotation stopper plate 13 is contacted with one flat face of the polygon. That is, the displacement of the axes of the optical fiber wires 21 can be corrected with coupling the plug A to the adapter B by allowing the elastic rotation stopper plate 13 to be bent in the space 37 between the elastic rotation stopper plate 13 and the inner wall of the adapter body 14 with a length of one fifteenth of one side of the polygon, and by rotating the rotating outer rings 4 provided at the rear end of the ferrule holder 2.

With reference to FIGS. 2 and 3, how to confirm the correction of the displacement of the axes of the optical fiber wires 21 will be described.

When the adapter B and the pair of plugs A are coupled and a silicone low crosslinking-density gel is enclosed, the pair of plugs A2, A4 being free are connected to an entrance (transmit section) and an outlet (receive section) of a measuring device, respectively. Then, the pair of ferrule holders 2 connected to the adapter B are rotated by rotating the rotating outer rings 4 in increments of one notch as confirming the value of connection loss displayed on the measuring device, and the pair of ferrule holders 2 are stopped at a position where the optimum value is displayed. The measuring device used for this adjustment may be a portable optical multimeter used in on-site application or an optical multimeter for research.

In the axes positioning mechanism for correcting the displacement of the axes of the optical fiber wires, the rotation stopper portion provided in each of the ferrule holders has been arranged in a regular octagon cross-section. However, if a fine adjustment is necessary, the number of polygon may be increased. In case of the odd number of polygon, the number of the rotation stopper plate will be one.

In the axes positioning mechanism for correcting the displacement of the axes of the optical fiber wires, the elastic rotation stopper plate has been attached to the adapter body. However, the present invention is not limited to this embodiment, and the elastic rotation stopper plate may be attached to the ferrule holder. In this case, it would be able to apply to existing optical fiber connectors specified in JIS C5970 or the like whereby the rotation stopper portion and rotation stopper plate which are provided in the ferrule holder are located on the opposite side with respect to the plug.

The two faces of the rotation stopper portion 33 formed in the polygon cross-section provided at the ferrule-mounting portion are closely contacted with and pressed by the elastic rotation stopper plate 13 provided in the shell 12 housed in the adapter body 14.

The ferrule holder has been constructed by integrating the ferrule-mounting portion, the rotation stopper portion, the buffer spring receiving flange and the polygonal shaft portion, and pressing the rotating outer ring into the polygonal shaft portion. Alternatively, the ferrule-mounting portion from may be separated from the buffer spring receiving flange, and other parts may be integrated to form a functional holder. In this case, a ferrule holder may comprise the ferrule-mounting portion and the buffer spring receiving flange, which are fixed by female and male threads. While each component of the above embodiment has been formed of light alloy, any suitable engineering plastics having substantially the same strength may be substituted for such a material.

While the case has been molded by using ABS resin which is one of the engineering plastics, and the coupling-release push spring attached to the case has been formed of a blade spring, any suitable engineering plastic having a resilient and high impact-resistance may be substituted for such an engineering plastic to integrate the case and the spring. This contributes to weight reduction.

In the adapter, the adapter body, the engagement stem with coupling hook and the positioning guide attached to the adapter body are integrally molded by using POM resin which is one of elastic engineering plastics. The shell is split into two, and each of the ends of the shell has the elastic rotation stopper plates. When the pair of split shells are coupled, the space housing the sleeve is a polygon. The shell and the elastic rotation stopper plates are also integrally molded by using POM resin which is one of elastic engineering plastics.

The adapter is coupled with the plug through one-touch operation, i.e. by matching the coupling guide side-grooves of the plug with the positioning guide of the adapter and pushing the plug into the adapter. The coupling is released by pushing the coupling-release push spring of the plug and pulling out the plug.

Using an optical fiber bonding material injection device for enclosing the silicone low crosslinking-density gel in the connection space makes a substantial contribution to enclosing with high accuracy and reducing working hours. It takes only ten seconds to completely enclose the silicone low crosslinking-density gel for one junction.

Each of the adapter and the plug according to the present invention is formed in a given cylindrical external shape. Thus, if a part of this cylinder is concaved to form a mounting portion and a housing for this cylinder is provided, a two-core or multiple-core plug, or a distribution box for connecting another optical fiber wires is easily formed. A shaft portion having a polygon cross-section is formed in a part of ferrule holder forming this plug, so as to provide a mounting portion for fitting into the housing.

While each outer shape of the adapter and the ferrule holder has been formed in a cylindrical shape, the present invention is not limited to such a shape, and it is apparent to use a polygonal shape.

INDUSTRIAL APPLICABILITY

The present invention is constructed as described above, and thus has the following effects.

The following experimental result shows the comparison of each connection loss of a single-mode FC-type optical fiber connector (the ferrule has a planar-polished end) and an optical fiber connector mechanism according to the present invention. Generally, the connection loss of the single-mode FC-type optical fiber connector be described as 0.2 dB/m or less. The five samples of the FC-type optical fiber connectors on the left side have been selected from 20 measured samples in five different levels of connection loss. The connection losses on the right side was measured by fabricating an adapter in the optical fiber connector mechanism according to the present invention to match with the plug of the above FC-type optical fiber connector, and applying the silicone low crosslinking-density gel to the fabricated five samples.

| Experimental Result Connection loss of FC-type Optical fiber connector | | | Unit: dB Connection loss of optical fiber connector mechanism according to the present invention |
|---|---|---|---|
| Sample | 1 | 0.0999 | +0.0204 |
| | 2 | 0.1819 | 0.0009 |
| | 3 | 0.2840 | 0.0033 |
| | 4 | 0.6611 | 0.0116 |
| | 5 | 0.8196 | 0.0153 |
| Reference | 6 | 1.3828 | 0.0155 |

From the above comparison of the connection loss, it is proved that the connection loss gets close to zero excepting the transmission loss of the optical fiber itself by simultaneously implementing the axes positioning mechanism for correcting the displacement of the axes of the optical fiber wires and the silicone low crosslinking-density gel as a junction conductor capable of minimizing the connection space for the mechanism. The values of samples 1 and 2 on the left side are ranged within the connection loss of 0.2 dB/m specified in the FC-type optical fiber connectors. As shown the corresponding values according to the present invention on the right side, the connection loss values are ranged within 0.001 dB/m, and thus the connection loss value can get almost close to zero. The optical transmittance of the left side is 95.4992%, while the optical transmittance on the right side according to the present invention is 99.9978%. While the samples 3 and 4 are out of the specification, each connection loss of the samples 3 and 4 according to the present invention can be ranged within 0.02 dB. The largest connection loss of the samples out of the specification is 0.6611 dB and the corresponding optical transmittance is 85.8795%, while the optical transmittance according to the present invention is 99.5405%. In the sample 5 and the reference 6, the finishing process in the polishing processes was omitted. In this case, the optical fiber connector mechanism according to the present invention can also achieve the connection loss within 0.02 dB. The reason why the sample 1 exhibited positive value is that the performance of the master cord exceeds, and it is not the result from amplification by the silicone low crosslinking-density gel. Each length of the samples was 3 m.

Then, three samples having the connection loss of 0.2 dB/m or less were randomly selected from the 20 FC-type optical fiber connector samples, and the connection loss of the coupled samples having the connection loss of 0.0999 dB, 0.1888 dB and 0.1931 dB, respectively, was measured. The number of junctions is three, and the sum of the connection loss was 0.8758 dB. When the above two techniques according to the present invention are simultaneously implemented at the three junctions by using the aforementioned adapter, the sum of the connection loss was 0.0327 dB. The optical transmittance on the left side is 81.7372%, whereas the optical transmittance of the optical fiber connector mechanism according to the present invention is 99.2498%.

Further, only the split sleeve was used as a substitute for the adapter, and the plug was inserted into the sleeve. Then, the silicone low crosslinking-density gel was injected in the open connection space, and the sleeve and adapter were dropped into the water. Then, the connection loss was measured with exposing the silicone low crosslinking-density gel in the water. This measured value was stable regardless of the lapse of time. This demonstrates an optimum function of preventing any functional deterioration due to invaded dust and vapor, and condensation. Thus, by using the silicone low crosslinking-density gel, the application can be expanded without changing the structure of the existing optical fiber connector.

Each connection loss of the fusion bonding technique and fixed connecting technique is specified as 0.01 dB/m. Thus, this requirement will be sufficiently satisfied by simultaneously implementing the two techniques according to the present invention.

What is claimed is:

1. An optical fiber connector comprising:
   a first plug for retaining a first optical fiber core wire having a first optical fiber wire coaxially therein with protruding said first optical fiber wire from said first plug;
   a second plug for retaining a second optical fiber core wire having a second optical fiber wire coaxially therein with protruding said second optical fiber wire from said second plug;
   an adapter for coupling said first and second plugs with opposing each end of said first and second optical fiber wires, wherein each of said first and second plugs includes a ferrule holder fitted with a ferrule for retaining the optical fiber wire and a case for housing said ferrule holder;
   at least one of said ferrule holders of said first and second plugs is rotatably supported about the axis of the corresponding case with respect to the corresponding case, wherein said rotatably supported ferrule holder includes a rotation stopper portion formed in a part thereof, said rotation stopper portion having a polygon cross-section;
   a rotation stopper plate selectively engaging with a plurality of faces formed on the outer periphery of said rotation stopper portion, said rotation stopper plate having elasticity, wherein said rotation stopper plate is adapted to elastically engage selectively with one of said plurality of faces so as to define the rotational position of said ferrule, wherein said rotation stopper plate is attached to said adapter, and
   wherein said rotation stopper portion is formed at the end of said rotatably supported ferrule holder opposed to said adapter.

2. An optical fiber connector as defined in claim 1, wherein said adapter includes a shell through which said ferrule is rotatably inserted, wherein
   said rotation stopper plate is attached to extend from one end of said shell opposed to said rotation stopper portion toward said rotation stopper portion.

3. An optical fiber connector as defined in claim 2, wherein said shell includes a sleeve having both ends through which said ferrules of said first and second plugs are inserted, respectively.

4. An optical fiber connector as defined in claim 3, which further includes a space through which said first and second optical fiber wires are opposed to each other, said space defining a connection space in said sleeve, wherein said connection space is filled with a transparent silicone low crosslinking-density gel having a refractive index substantially equal to that of said optical fiber wires.

5. An optical fiber connector as defined in claim 1, which further includes a space through which said first and second optical fiber wires are opposed to each other, said space defining a connection space, wherein said connection space is filled with a transparent silicone low crosslinking-density gel having a refractive index substantially equal to that of said optical fiber wires.

6. An optical fiber connector as defined in claim 1, wherein each of said ferrule holders of said first and second plugs is rotatably supported about the axis of the corresponding case with respect to the corresponding case.

7. An optical fiber connector as defined in claim 1, which further includes a rotating outer ring fixed to the outer periphery of said rotatably supported ferrule holder, said rotating outer ring being adapted to be rotate so as to rotate said ferrule holder.

* * * * *